United States Patent
Gregory et al.

(10) Patent No.: US 8,448,435 B2
(45) Date of Patent: May 28, 2013

(54) CONTROL OF A SHAPE MEMORY ALLOY ACTUATION ARRANGEMENT

(75) Inventors: Thomas Matthew Gregory, Cambridgeshire (GB); Robert John Leedham, Cambridge (GB); David Charles William Richards, Milton (GB); Richard Topliss, Trumpington (GB)

(73) Assignee: Cambridge Mechatronics Limited, Cambridge (GB)

( * ) Notice: Subject to any disclaimer, the term of this patent is extended or adjusted under 35 U.S.C. 154(b) by 158 days.

(21) Appl. No.: 13/126,401

(22) PCT Filed: Oct. 29, 2009

(86) PCT No.: PCT/GB2009/002570
§ 371 (c)(1),
(2), (4) Date: Jul. 28, 2011

(87) PCT Pub. No.: WO2010/049689
PCT Pub. Date: May 6, 2010

(65) Prior Publication Data
US 2011/0277462 A1 Nov. 17, 2011

(30) Foreign Application Priority Data

Oct. 29, 2008 (GB) .................................. 0819774.1
Nov. 20, 2008 (GB) .................................. 0821209.4
Dec. 5, 2008 (GB) .................................. 0822233.3

(51) Int. Cl.
*F01B 29/10* (2006.01)
*F02G 1/04* (2006.01)

(52) U.S. Cl.
USPC .............................................. 60/528; 60/527

(58) Field of Classification Search
USPC .................... 60/527–529; 219/497, 499, 504, 219/505; 373/101, 102, 137
See application file for complete search history.

(56) References Cited

U.S. PATENT DOCUMENTS

| 4,977,886 A | 12/1990 | Takehana et al. |
| 5,459,544 A | 10/1995 | Emura |

(Continued)

FOREIGN PATENT DOCUMENTS

| EP | 1 914 422 A1 | 4/2008 |
| JP | 2007315352 A | 12/2007 |

(Continued)

*Primary Examiner* — Thomas Denion
*Assistant Examiner* — Brian Inacay
(74) *Attorney, Agent, or Firm* — Harness, Dickey & Pierce, P.L.C.

(57) ABSTRACT

An SMA actuation apparatus comprises: an SMA actuator arranged to drive movement of a movable element; a current supply supplying a drive current; a detection circuit detecting a measure of the resistance of the SMA actuator; and a control unit operative to generate a closed-loop control signal supplied to current supply for controlling the power of the drive current to drive the resistance of the SMA actuator to a target value. The control unit derives: an estimate of a characteristic temperature of the SMA actuation apparatus on the basis of the supplied power, using a thermal model; and a resistance offset on the basis thereof. The closed-loop control signal is generated on the basis of the error between the measure of the resistance of the SMA actuator and the target value of the resistance of the SMA actuator, adjusted by the resistance offset to compensate for variations in resistance.

20 Claims, 3 Drawing Sheets

U.S. PATENT DOCUMENTS

| | | |
|---|---|---|
| 5,763,979 A | 6/1998 | Mukherjee et al. |
| 6,516,146 B1 | 2/2003 | Kosaka |
| 6,554,501 B2 | 4/2003 | Kosaka et al. |
| 6,574,958 B1 | 6/2003 | MacGregor |
| 6,945,045 B2 | 9/2005 | Hara et al. |
| 2001/0002226 A1 | 5/2001 | Tanaka et al. |
| 2001/0025477 A1 | 10/2001 | Hara et al. |
| 2002/0113499 A1 | 8/2002 | von Behrens et al. |
| 2006/0150627 A1 | 7/2006 | Oohara |
| 2006/0209195 A1 | 9/2006 | Goto |
| 2008/0278030 A1 | 11/2008 | Hara et al. |
| 2008/0278590 A1 | 11/2008 | Tanimura et al. |
| 2008/0282696 A1 | 11/2008 | Wada et al. |
| 2009/0009656 A1 | 1/2009 | Honda et al. |
| 2009/0295986 A1 | 12/2009 | Topliss et al. |
| 2009/0301077 A1* | 12/2009 | Takahashi .................. 60/528 |
| 2010/0060776 A1 | 3/2010 | Topliss et al. |
| 2010/0074608 A1 | 3/2010 | Topliss |
| 2010/0275592 A1 | 11/2010 | Topliss et al. |
| 2010/0320943 A1 | 12/2010 | Honda |
| 2011/0032628 A1 | 2/2011 | Tanimura et al. |

FOREIGN PATENT DOCUMENTS

| | | |
|---|---|---|
| JP | 2009086142 A | 4/2009 |
| JP | 2010185930 A | 8/2010 |
| WO | WO-03/012384 A2 | 2/2003 |
| WO | WO-2005/026539 A2 | 3/2005 |
| WO | WO-2005075823 A1 | 8/2005 |
| WO | WO-2006105588 A1 | 10/2006 |
| WO | WO-2007-113478 A1 | 10/2007 |
| WO | WO-2008-099155 A1 | 8/2008 |
| WO | WO-2008-099156 A2 | 8/2008 |
| WO | WO-2008-129291 A2 | 10/2008 |
| WO | WO-2008129290 A1 | 10/2008 |
| WO | WO-2009056822 A2 | 5/2009 |
| WO | WO-2009-071898 A2 | 6/2009 |
| WO | WO-2009090958 A1 | 7/2009 |

* cited by examiner

CONTROL OF A SHAPE MEMORY ALLOY ACTUATION ARRANGEMENT

CROSSREFERENCE TO RELATED APPLICATIONS

This application is a 371 U.S. National Stage of International Application No. PCT/GB2009/002570, filed Oct. 29, 2009. This application claims priority to British patent application No. 0819774.1 filed with the Intellectual Property Office on Oct. 29, 2008, application No. 0821209.4, filed with the Intellectual Property Office on Nov. 20, 2008, and application No. 0822233.3, filed with the Intellectual Property Office on Dec. 5, 2008, all of which are herein incorporated by reference in their entirety.

The present invention relates generally to control of an SMA (shape memory alloy) actuation arrangement that comprises an SMA actuator arranged on contraction caused by heating to drive movement of a movable element relative to a support structure.

The present invention has particular application to precision actuation of a relatively small movable element, for example a camera lens element, particularly a camera lens element of the type used in a miniature camera which may be employed in a portable electronic device such as a mobile telephone or a mobile digital data processing and/or transmitting device.

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement.

Similar considerations apply to actuation arrangements for a wide range of other small objects.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electroactive devices.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a drive current through the SMA actuator to heat it causing the phase change. The phase change occurs over a range of temperature due to the statistical spread of transition temperature in the SMA crystal structure. The SMA actuator is arranged so that the contraction drives movement of the movable element.

The use of SMA material as an actuator for a small element such as the camera lens element of a miniature camera provides the advantages of being intrinsically linear, providing a high power per unit mass, being a low cost commodity item and being a relatively small component.

The present invention is concerned with the control of such an SMA actuation arrangement, and in particular with the need to provide for precision control of position. In general terms this is not straightforward due to the inherent physical properties of SMA material. Position is controlled by varying the temperature of the SMA material and the temperature may be controlled by supplying drive current through the SMA actuator. However, there is not a simple relationship between position and drive current. For example, the relationship between temperature and position is non-linear and also hysteretic, following different curves during heating and cooling. Furthermore, the relationship between the drive current and the temperature of the SMA actuator is complicated, this depending on the history of the heating and an the amount of cooling which is itself strongly dependent on the ambient temperature. As a result, in practice the control of the SMA actuator is complicated. Closed-loop control of an SMA actuation arrangement may be applied using a measure of the resistance of the SMA actuator is used as the feedback signal. In this case, a closed-loop control signal for controlling the power of the drive current is generated on the basis of an error between the measure of the resistance of the SMA actuator detected by the detection circuit and a target value for the resistance of the SMA actuator. Such closed-loop control allows accurate control of position because the resistance of the SMA actuator varies with the length of the SMA actuator in a predictable manner. Furthermore, use of resistance measurement has significant advantages over use of a sensor to detect the actual physical position of the movable element, including accuracy and being straightforward and compact to implement, simply by providing additional electronic components supplementing the elements needed to provide the drive current which heats the SMA actuator.

Although closed-loop control based on resistance of the SMA actuator provides for reasonably accurate control, it has been appreciated that some degree of inaccuracy arises from creep (or drift) that occurs over time. That is to say, it is observed that over time the degree of contraction of the SMA actuator at a given resistance changes, or conversely the resistance of the SMA actuator at a given degree of resistance changes. Such creep reduces the degree to which the control of the SMA actuator is predictable when the SMA actuator is operated for a long period of time or on different occasions.

This problem of creep is discussed in WO-2008/129291 which hypothesizes that the creep is caused by adjacent components of significant thermal mass causing thermal dead-spots in the SMA actuator that heat less rapidly than the remainder of the SMA actuator. WO-2008/129291 also proposes a solution to this problem involving the provision of electrically conductive material along a portion of the SMA actuator to short-circuit that portion. This is effective, but requires additional manufacturing steps and therefore cost, as well as reducing the effective length of the SMA actuator.

The first aspect of the present invention is concerned with reducing this problem of creep.

According to the first aspect of the present invention, there is provided a method of controlling an SMA actuation apparatus comprising an SMA actuator arranged on contraction caused by heating to drive movement of a movable element relative to a support structure on which the movable element is supported, the method comprising supplying a drive current through the SMA actuator to heat the SMA actuator, the power of the drive current being controlled on the basis of a closed-loop control signal for driving the resistance of the SMA actuator to a target value by performing the steps of:

detecting a measure of the resistance of the SMA actuator;

deriving an estimate of at least one characteristic temperature of the SMA actuation apparatus on the basis of the power of the drive current, using a thermal model that relates the at least one characteristic temperature of the SMA actuation apparatus to the power of the drive current;

deriving a resistance offset on the basis of the estimate of at least one characteristic temperature of the SMA actuation apparatus, using a resistance model that relates a resistance offset that compensates for the variation of the resistance of the movable element with the at least one characteristic temperature of the SMA actuation apparatus to the at least one characteristic temperature of the SMA actuation apparatus; and generating the closed-loop control signal for controlling the power of the drive current on the basis of the error between the measure of the resistance of the SMA actuator and the target value of the resistance of the SMA actuator, adjusted by the resistance offset.

Further according to the first aspect of the present invention, there is provided a control system for an SMA actuation arrangement implementing a corresponding method.

The first aspect of the present invention reduces the degree of creep using a modification to the nature of the closed-loop control, rather than the physical construction of the SMA actuation apparatus. In particular, it is based on an appreciation that the creep (or drift) can be compensated by deriving a resistance offset from estimates of at least one characteristic temperature of the SMA actuation apparatus derived on the basis of the power of the drive current supplied to the SMA actuator using a thermal model of the SMA actuation apparatus. This is because the creep is caused by the contraction and resistance of the SMA actuator being affected by temperature of the surrounding components of the SMA actuator apparatus which are themselves heated by the power supplied to the SMA actuator, but which have different thermal time constants.

The SMA actuator is driven by applying a drive current, which heats the SMA material through a reversible phase change. As power is increased and the temperature of the SMA actuator rises, there are competing phenomena that affect resistance. For example, as with any metal, resistivity of a specific phase increases with temperature. As the SMA actuator contracts on heating, this tends to reduce resistance. In addition, the Martensite and Austenite phases also have different resistivities. Therefore, since there are competing factor tending to increase and decrease resistance as temperature is increased, what is observed is that the resistance initially increases, before reaching a maximum, then the resistance falls as the SMA actuator contraction dominates, followed by reaching a minimum resistance as the phase change nears completion, followed by the resistance rising again. Closed loop resistance feedback control of position is effective in a region between the maximum and minimum resistances, where the change in resistance is dominated by the change in SMA actuator length.

However there are various non-linearities that alter the time dependence of actuator position, when maintaining a particular target resistance. One example is associated with the ends of the SMA actuator that are typically mounted at one end to a fixed body, and at the other end to a moving body. These bodies may typically be metal or plastic depending on whether the end point also forms an electrical connection to the SMA actuator. These end mounting bodies have a thermal mass, and will typically heat up over time, but with a different time constant to the central portion of the SMA actuator. In this way, the SMA actuator near the ends loses heat to the end bodies, but does so at a lower rate over time, as these bodies heat up. For the SMA actuator regions very close to the end bodies, they may never reach a temperature which corresponds to the phase change, in which case, as the end bodies heat up over time, and these end regions of the SMA actuator also heat up, their resistance will increase. Regions slightly further away, may begin to enter the phase change region after an extended time and begin to contract. It can be appreciated that as the resistance of the end regions increases over time, since these regions are inside the closed loop resistance feedback loop, the control algorithm will attempt to reduce the resistance of the SMA actuator as a whole by applying more power, which further drives the phase change. On this basis, over time, as a resistance is maintained, the position tends to creep in the direction of higher temperature as more power is applied in response to the thermal time constants of the end bodies. It is highly desirable to compensate for this and other effects.

It has been appreciated that a thermal model may be used to derive estimates of one or more characteristic temperatures of the SMA actuator apparatus based on the history of the power that has been supplied over time, which one or more characteristic temperatures may in turn be used to derive a resistance offset that compensates for the creep. The thermal model relates the at least one characteristic temperature of the SMA actuation apparatus to the power of the drive current. This is effectively an open-loop model to estimate the temperature of the SMA actuator and the surrounding components of the SMA actuation apparatus, for example by assuming one or more thermal time constants in series, combined with a cumulative assessment of the power applied to the SMA actuator, together with knowledge of the ambient temperature of the system, which estimates the heat dissipation from the system. One example of such a thermal model is to assume a two-stage model, where the SMA actuator loses heat to an environment of finite size immediately around the SMA actuator. This environment in turn dissipates heat to an ambient environment, whose temperature is assumed invariant over time. However, in general the thermal model may be of any order.

The parameters of the thermal model and the resistance model are related to the specific mechanical arrangement of the SMA apparatus and so may be determined by experiment. The thermal model may also be based on ambient temperature, so the method may be improved by determining the ambient temperature and taking this into account.

With closed-loop control based on resistance, the resistance is driven to a target value within a range from an upper limit to a lower limit. Closed-loop control becomes impractical close to local maximum and local minimum because the position-resistance gain approaches infinity. In practice, therefore the upper limit and the lower limit of the closed-loop region are set to be offset from the local maximum and minimum resistances.

The second aspect of the present invention is concerned with maximising the range of movement available with closed-loop control based on resistance.

According to the second aspect of the present invention, there is provided a method of controlling an SMA actuation apparatus comprising an SMA actuator arranged on contraction caused by heating to drive movement of a movable element relative to a support structure on which the movable element is supported, the method comprising supplying a drive current through the SMA actuator to heat the SMA actuator, the power of the drive current being controlled on the basis of a closed-loop control signal for driving the resistance of the SMA actuator to a target value selected in a range between an upper limit and a lower limit, wherein the upper limit is derived by the steps of:

whilst monitoring a measure of the resistance of the SMA actuator, heating the SMA actuator from an unheated state and detecting the maximum value of the measure of resistance; and determining whether the ambient temperature is above a reference temperature;

deriving the upper limit as the detected maximum value less a decrement that is dependent on the detected ambient temperature, the decrement having a predetermined value when the detected ambient temperature is not above the reference temperature and having a value less than the predetermined value when the detected ambient temperature is above the reference temperature.

Further according to the second aspect of the present invention, there is provided a control system for an SMA actuation arrangement implementing a corresponding method.

The second aspect of the invention deals with an issue that has been appreciated as follows. At relatively high ambient temperature, the true local maximum may occur at a temperature below ambient temperature. In this case, the SMA actuator is already in the closed-loop region in its unheated state before the drive current is applied. Therefore, the initial resistance is detected as the maximum, but this is below the local maximum that would occur at lower ambient temperatures. Setting the upper limit a predetermined decrement below this detected maximum reduces the range of movement available using closed-loop control even though in this situation, closed-loop control could be performed right up to the detected maximum. In the case of a camera where the infinity focus is provided at the end of the range of travel corresponding to the resistance maximum, the loss of movement discussed above may lead to the movable element no longer being able to reach infinity focus.

However, the second aspect of the present invention involves the decrement having a predetermined value when the detected ambient temperature is not above a reference temperature and having a value less than the predetermined value when the detected ambient temperature is above that reference temperature. Whether or not the ambient temperature is above a reference level may be determined by determining a measure of ambient temperature or simply by determining whether there is a local maximum during the heating of the SMA actuator. The reference temperature is selected to be a temperature at which the SMA actuator is already in the closed-loop region. Thus, at this temperature or above, selecting a decrement having a lower decrement reduces the loss of range just discussed.

To allow better understanding, an embodiment of the present invention will now be described by way of non-limitative example with reference to the accompanying drawings, in which.

There will first be described the structure of a camera 1 incorporating an SMA actuation apparatus. The camera 1 is to be incorporated in a portable electronic device such as a mobile telephone, media player or portable digital assistant.

Figure 1:
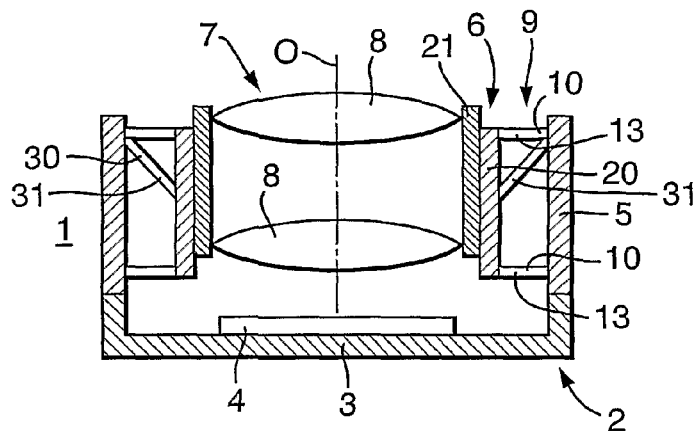
FIG. 1 is a schematic cross-sectional view of a camera incorporating an SMA actuation arrangement.

The camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The lens element 6 has a two-part construction comprising a lens carrier 20 and a lens holder 21 mounted inside the lens carrier 20 on an internal screw thread 22 formed inside the lens carrier 20. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. Each suspension element 10 comprises flexures 13 which each are coupled at opposite ends to the lens element 6 and the annular wall 5 of the support structure 2. The suspension system 9 guides movement of the lens element 6 along the optical axis O. Such movement of the lens element 6 changes the focus of the image formed on the image sensor 4.

The camera 1 comprises an SMA actuator 30 which comprises plural lengths of SMA wire 31. The SMA actuator 30 may be made of any suitable SMA material, for example Nitinol or another Titanium-alloy SMA material. SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the lengths of SMA wire 31 causes them to decrease in length. The lengths of SMA wire 31 are connected in tension between the annular wall 5 of the support structure 2 and the lens element 6 at an angle to the optical axis O so that on contraction they apply a tensional force having a component along the optical axis O, in particular in a direction biassing the lens element 6 away from the image sensor 4. This is used to drive movement of the lens element 6 along the optical axis O as will now be described.

The force applied by the SMA actuator 30 deflects the flexures 13 of the suspension system 10 which thereby generate a biassing force in the opposite direction along the optical axis O. Thus, the suspension system 9 provides the function of acting as a passive biassing arrangement for the SMA actuator 30, as well as the function of suspending and guiding movement of the camera lens element 6.

In the unheated state of the SMA actuator 30, the lens element 6 is in its closest position to the image sensor 4 within its range of movement. The camera 1 is designed so that this position corresponds to far-field or hyperfocal focus, which is the most common setting for the camera 1, particularly if an auto-focus function is provided. On heating, the SMA actuator 30 drives movement of the lens element 6 away from the image sensor 4. The lens element 6 moves over a range of movement as the temperature of the SMA actuator 30 increases over the range of temperature in which the transition of the SMA material from the Martensite phase to the Austenite. The position of the lens element 6 relative to the support structure 2 along the optical axis O may be controlled by control of the temperature of the SMA actuator 30. In operation, heating of the SMA actuator 30 is provided by passing a current therethrough which provides resistive heating. Cooling is provided by ceasing the current and allowing the SMA actuator 30 to cool by conduction to its surroundings. The current is supplied by a control circuit 50 which is described further below.

The camera 1 may have the detailed construction of any of the cameras described and shown in WO-2007/113478; WO-2008/099156; or WO-2008/099155 which are incorporated herein by reference. As another alternative, the camera 1 may include a separate biassing element in addition to the suspension system, for example having the construction described and shown in WO-2009/056822 which is incorporated herein by reference. However, none of these detailed constructions are essential and in general the present invention may be applied to an SMA actuation apparatus for any kind of movable object requiring precision control, without limitation to cameras.

The nature of the control circuit 50 and the control effected thereby will now be described.

Figure 2:
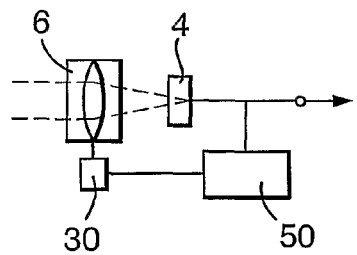
FIG. 2 is a schematic diagram of the overall control arrangement of the camera.

A schematic view of the overall control arrangement is shown in FIG. 2. The control circuit 50 is connected to the SMA actuator 30 and applies a current thereto to control the temperature of the SMA actuator 30 which moves the lens element 6 and changes the focus of the image formed on the image sensor 4. The output of the image sensor 4 is supplied to the control circuit 50 to be processed for determination of a measure of the quality of focus.

The control circuit 50 controls the degree of heating of the SMA actuator 30 by varying the power of the current flowing therethrough in response to the resistance of the SMA actuator 30 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50. The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 3:
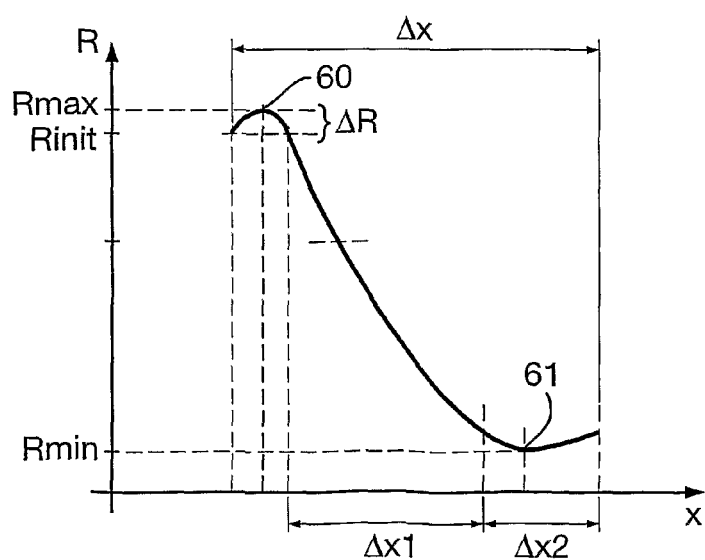
FIG. 3 is a graph of the resistance-length property of SMA during contraction.

Thus, SMA material has a property that resistance varies with length during heating and contraction along a curve of the form shown in FIG. 3 which is a graph of resistance of an SMA actuator against its length, corresponding to the position x of the lens element 6, the length increasing as the SMA material contracts corresponding to increasing temperature. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax. The resistance falls across the major part of the positional range $\Delta x$ to a local minimum 61 having a resistance value Rmin, whereafter the resistance rises across a final part of the positional range $\Delta x$. Although the other factors affecting and increasing resistance make the overall relationship between temperature and resistance highly nonlinear, the process of contraction and the associated reduction in resistance produce an almost linear dependence between resistance and position based on measurement over the greater part of the positional range $\Delta x$ between the local maximum 60 and the local minimum 61. Although the underlying physics is not entirely understood, the phenomenon is empirically observed and helps when applying closed-loop control as discussed below.

The control circuit 50 uses pulse-width modulation (PWM). In particular, the control circuit 50 applies a pulse-width modulated current pulses (which may be under constant current or constant voltage control) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the SMA actuator 30 is low and so the SMA actuator 30 cools even though some current is being supplied. Conversely, when the duty cycle is at a high value in the range, the SMA actuator 30 heats. The resistance is measured during the current pulse, for example after a short, predetermined delay from the start of the pulse.

During heating of the SMA actuator 30 from a cool state below the phase transition range, the resistance varies with position in the manner shown in FIG. 3 in a manner which is consistent from sample to sample and in successive heating cycles. During cooling the resistance changes along a curve which is different but of similar form.

Figure 4:
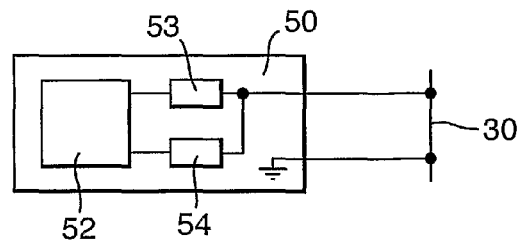
FIG. 4 is a diagram of the control circuit.

The control circuit 50 is shown in FIG. 4 and includes the following components.

The control circuit 50 includes a drive circuit 53 which is connected to supply current to the SMA actuator 30. The drive circuit 53 may be a constant-voltage current supply or a constant-current current supply. For example, in the latter case the constant current might be of the order of 120 mA.

The control circuit 50 further includes a detection circuit 54 arranged to detect the resistance of the SMA actuator 30. If the drive circuit 53 is a constant-current current supply, the detection circuit 54 may be a voltage detection circuit operable to detect the voltage across the SMA actuator 30 which is a measure of the resistance of the SMA actuator 30. If the drive circuit 53 is a constant-voltage current supply, the detection circuit 54 may be a current detection circuit. For a higher degree of accuracy the detection circuit 54 may comprise a voltage detection circuit and a current detection circuit operable to detect the voltage and current across the SMA actuator and to derive a measure of resistance as the ratio thereof.

Figure 5:
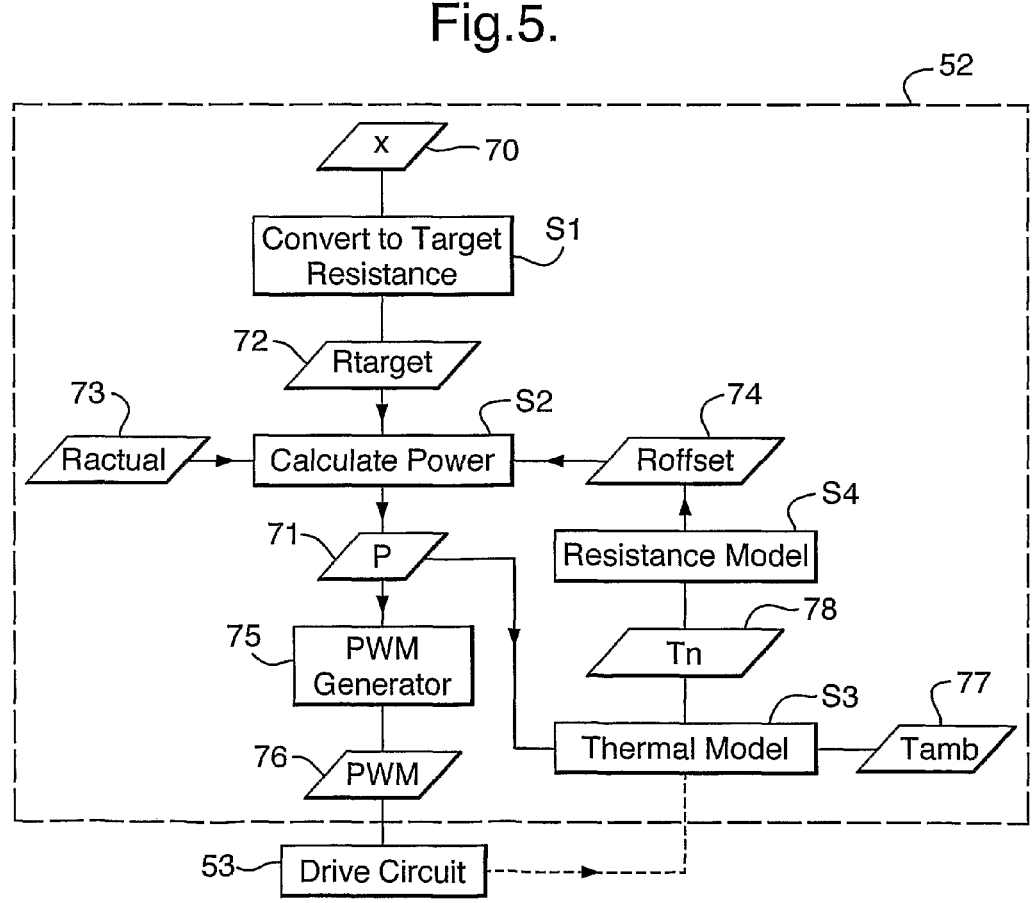
FIG. 5 is a schematic diagram of the closed-loop control implemented by the control unit of the control circuit.
Figure 6:
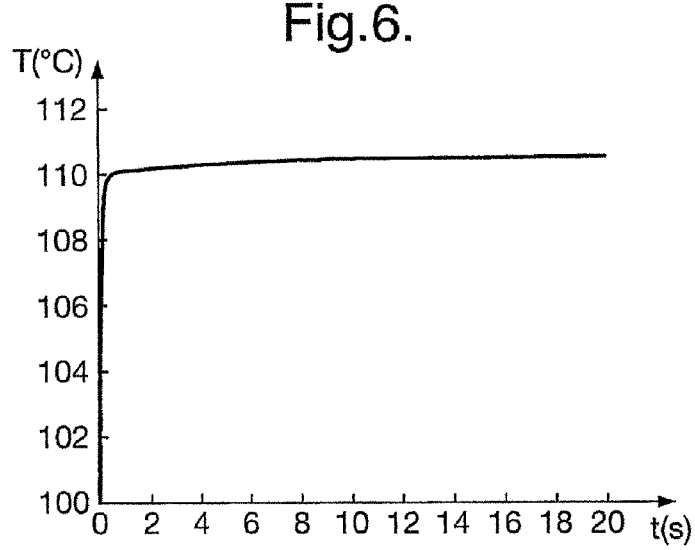
FIG. 6 is a graph of temperature response of the SMA actuator to a step change in power.

Two detailed circuit implementations for the control circuit 50 are shown and described in WO-2009/071898 which is incorporated herein by reference, in particular in FIGS. 5 and 6 of WO-2009/071898 and the associated description.

The control circuit 50 further includes a control unit 52 which is operative to generate a control signal which is supplied to the drive circuit 53 to cause the drive circuit to supply a PWM drive current. The control unit 52 varies the power of the drive current by varying the duty cycle of the PWM drive current. The control unit 52 may be implemented in digital logic, preferably by a microprocessor running an appropriate program. The control unit 52 is operative to provide closed-loop control for driving the resistance of the SMA actuator to a target value.

Optionally, the control unit 52 may additionally implement open-loop control in combination with closed-loop control to provide movement outside the limited range of movement achievable by closed-loop control, as disclosed in detail in WO-2009/071898 which is incorporated herein by reference, and which refers to this as a "mixed mode".

In providing closed-loop control, the control unit 52 receives the resistance measured by the detection circuit 54 and varies the power of the drive current in response thereto, using the measured resistance of the SMA actuator 30 as a feedback signal to drive the measured resistance to a target value for the resistance of the SMA actuator 30. In particular, the control unit 52 varies the power of the drive current on the basis of an error between the measured resistance and the target value.

The control unit 52 may implement a number of control algorithms to vary the power of the drive current. One possibility is proportional control in which the power is varied by an amount proportional to the difference between the detected resistance and the target resistance. Other possibilities include proportional-integral (PI) and proportional-integral-derivative (PID) control, also taking into account the integral and/or derivative of the error E. If integral control is applied, the integrator must be very carefully tuned to the system. If the integration is too quick, it will increase the tendency of the system to overshoot, and may indeed cause self-sustaining oscillation away from the mechanical resonance of the system. If the integration is too slow, then it will take a very long time to settle resulting in drift during operation. In practice, this may make it desirable to avoid integral control or to apply integral control over a relatively narrow bandwidth which does not extend to DC.

Optionally, the control unit 52 may adjust the closed-loop control signal by adding an offset which reduces the steady-state value of the error between the measure of the resistance of the SMA actuator detected by the detection circuit 54 and the target value, in the manner disclosed in detail in WO-2009/071898 which is incorporated herein by reference.

Within the feedback loop, the control unit 52 applies a resistance offset to the error between the resistance measured by the detection circuit 50 and the target resistance. The resistance offset is based on open-loop estimates of at least one characteristic temperature of the camera 1 over time as power is applied and heat is lost to the environment so as the compensate for the non-uniform thermal properties of the camera 1 that change according to different thermal time constants. The purpose of this and the specific implementation will now be described.

It has been appreciated that, in general terms, the temperature of the environment around the SMA actuator 30 has a large effect on its performance, and applying power to the SMA actuator 30 will cause the temperature of that environment to change. This can therefore manifest itself as a drift over time in the position of the SMA actuator 30 when driven to have a given resistance. Herein, this behaviour is informally referred to as "creep" (because this is a well-understood engineering term, and the symptom is similar). However, technically speaking the behaviour truly is a drift, and the true creep of the materials involved is genuinely negligible on the relevant timescale of seconds.

It has been appreciated that this creep (or drift) can be compensated by deriving a resistance offset from estimates of at least one characteristic temperature of the camera 1 themselves derived on the basis of the power of the drive current supplied to the SMA actuator 30 using a thermal model of the camera 1. Use of a resistance offset is feasible because position and resistance have some equivalence, provided the resistance offset is derived from the thermal model. This thermal model models the heating of the environment around the SMA actuator 30, which is essentially the elements of the camera 1 and the ambient temperature in which the camera 1 is situated. As the environment around the SMA actuator 30 is heated by the drive current passing through the SMA actuator, the thermal model relates the at least one characteristic temperature to the power of the drive current, in particular based on the history of the power that has been supplied over time, as follows.

Heating relationships are generally exponential in nature. For example, an appropriate formula describing the instantaneous temperature T of an object at time t in an environment of ambient temperature Tamb at initial temperature (Tamb+Texcess) would be:

$$T = T_{amb} + (T_{excess} \cdot \exp(-t/\tau))$$

where τ is a time constant of the heat transfer from the object to the environment. Due to the time quantisation inherent in digital control, it is convenient for the control unit 52 to employ a thermal model represented by differential forms of this equation.

At simplest, the thermal model represents just a single characteristic temperature T and in a differential notation is of the form:

$$\Delta T = (P/W) - ((T - T_{amb})/\tau)$$

where T is the instantaneous value of the characteristic temperature, Tamb is the ambient temperature, ΔT is the change of the characteristic temperature in a given period, P is the power applied in that period, W is heat transfer constant, ie a heat capacity, and τ is a thermal time constant. In this case, the characteristic temperature may be notionally thought of as the overall temperature of the components of the camera 1 surrounding the SMA actuator 30.

Additional accuracy can be achieved by employing a multi-stage thermal model of plural characteristic temperatures T1, T2, ..., Tn. in which each successive characteristic temperatures after the first is derived from a previous characteristic temperature. Mathematically the model can be expanded to any arbitrary order. Physically speaking, there can be many parts of the thermal environment of the SMA actuator 30, for example different physical components of the camera 1, each with their own magnitude and time constant. Thus a multi-stage thermal model can provide greater accuracy, albeit at the cost of greater complexity and calculation. The thermal model can be of arbitrary order (compensating for individual elements each with different thermal connection to the system, different time constants etc.). There is diminishing marginal return on increasing the model order. A cost-benefit type of calculation can be done to select an appropriate model order for the particular driver system. Effective compensation for drift may be achieved with a second order model. There appears to be appreciable benefit in increasing it to 3rd order, but as the order becomes higher, it becomes more difficult to separate the effect of the different orders. In this case, a numerical optimisation technique can be useful. This involves choosing a first guess set of coefficients for the thermal model, running a test signal through the actuator, and then adjusting parameters (using a random walk method of coefficient selection).

A multi-stage thermal model in differential notation may take the form of the following equations:

$$\Delta T1 = ((P/W1) - ((T1 - Tamb)/\tau 1))$$
$$\Delta T2 = ((T1 - Tamb)/W2) - ((T2 - Tamb)/\tau 2)$$
$$...$$
$$\Delta Tn = ((Tn\text{-}1 - Tamb)/W) - ((Tn - Tamb)/\tau n)$$

where:
T1, T2, ..., Tn are the instantaneous values of the characteristic temperatures;
Tamb is the ambient temperature;
$\Delta T1, \Delta T2, ..., \Delta Tn$ are the changes in each characteristic temperature in each period;
W1, W2, ..., Wn are the heat transfer constants for the camera 1, W1 being a heat capacity (in units of [energy]·[time]/[temperature]) per period (ie units of [energy]/[temperature] overall) and W2, ..., Wn being thermal transfer time constant (in units of [time]) per period (ie unit-less overall);
P is the energy supplied to the SMA actuator 30 per period; and
$\tau 1, \tau 2, ..., \tau n$ are thermal time constants (in units of [time]) per period (ie unit-less overall).

Thus, the first linear equation relates the change in the first characteristic temperature T1 to the instantaneous value of the first characteristic temperature T1 and the power of the drive current, whereas the further linear equations relate the change in a respective characteristic temperature T2, ..., Tn to the instantaneous value of that respective characteristic temperature T2, ..., Tn and the instantaneous value of at least one other characteristic temperature.

The equations are applied periodically to update the characteristic temperatures (in a period referred to as a "refresh period" below). The period at which each equation is updated need not be equal. When the equations are updated at different periods, the constants W1, W2, ..., Wn and $\tau 1, \tau 2, ..., \tau n$ are scaled relative to each other in accordance with the period at which each equation is updated. Typically, the first equation may be updated rapidly, at or close to the same rate as the closed-loop control scheme (typically ~2 kHz), but other equations may be updated more slowly even by orders of magnitude more slowly.

The characteristic temperatures have physical significance. In particular, the characteristic temperatures T1, T2, ..., Tn may be notionally thought of as the temperature of components of the camera 1 surrounding the SMA actuator 30 that have a further thermal mass and are thermally coupled to the SMA actuator 30. The reason why some equations may be updated more slowly than others is that they model components that change temperature more slowly than others.

The constants W1, W2, ..., Wn and $\tau 1, \tau 2, ..., \tau n$ may be thought of as notionally being the thermal constants of the components of the camera 1 and are derived as described below.

The thermal model also takes into account the ambient temperature Tamb. This is because heat transfer occurs from the camera 1 to the environment around it that may be assumed to have an invariant temperature, that is the ambient temperature. The ambient temperature Tamb is derived by the control unit 52 as described further below.

Alternatively, multiple characteristic temperatures could be calculated on the basis of the same input variable to represent effects of different time constant or magnitude.

In some cases there may be a choice of variables to use as input to a particular differential equation. There are physical reasons why one may be chosen above the other. For example, if the mechanism of heat transfer was really from one component to another component, both of whose temperatures are being estimated, then it would be appropriate to estimate the temperature measurement of the second component from the estimated temperature of the first component. However, calculation precision may force the implementer to choose a model which is less representative of the true thermal environment. Where long time-scales are involved, it can be very useful to rely on previously filtered data to lower the required precision in the differential calculation.

A similar type of thermal model is disclosed in WO-2009/071898 for the purpose of implementing an open-loop control algorithm for an SMA actuator, without resistance feedback. However it has been appreciated that a thermal model can also be used to compensate for the creep in position under closed-loop control by making two significant changes. Firstly, the thermal model is itself adapted so that all the characteristic temperatures are representative of temperatures of the components of the camera 1 surrounding the SMA actuator 30, rather than one of the characteristic temperatures being representative of the SMA actuator 30 itself. This means the parameters of the thermal model need corresponding adaption. Secondly, the approach is adapted by instead deriving a resistance offset from the at least one characteristic temperature that offsets the resistance error in the closed-loop control.

The resistance offset is derived from the at least one characteristic temperature of the camera 1 using a resistance model that relates the resistance offset to the at least one characteristic temperature. The resistance offset is updated each time that any characteristic temperature is updated. In general, the resistance model could be a complex non-linear function to assess the impact of the at least one characteristic temperature on resistance. Such a complex scaling function would require an estimate of ambient temperature plus also a model of wire resistance with temperature. However, in practice it is found that simple scaling factors are sufficient to achieve the required level of performance. In this case, resistance model is a linear equation, for example of the form:

$$Roffset = (T1/Y1) + (T2/Y2) + \ldots + (Tn/Yn)$$

where Roffset is the resistance offset and Y1, Y2, ..., Yn are scaling constants and are derived as described below.

The control unit 52 applies the resistance offset thus derived to offset the error between the measured resistance of the SMA actuator 30 and the target value. That is, the control unit 52 controls the power of the drive current on the basis of that error offset by the resistance offset rather than the error itself. Accordingly, this offset and the resultant compensation for creep (or drift) can be applied without any alteration to the core SMA control algorithm. A control system based on resistance feedback will require the resistance of the actuator to be assessed from time-to-time. To implement a drift compensated response, any time the resistance of the actuator is found, the instantaneous calculated resistance offset due to drift is added before the resistance is returned to the controller.

An example of the operation of the control unit 52 ro provide such closed-loop control is shown in FIG. 5 and will now be described. The control unit 52 takes a demanded position x represented by data 70 as the input and on the basis thereof derives the power P of the drive current to be supplied to the actuator as a power control signal 71. To achieve this, the control unit 52 performs the following operations.

In step S1, the demanded position x represented by data 70 is converted to a target resistance Rtarget. This may be performed in accordance with the equation:

$$Rtarget = Ru - (\lambda \cdot x)$$

where Ru is an upper limit of the range of target resistances and λ is a scaling factor. For example, λ may have a predetermined value or may be calculated from the upper limit Ru and the lower limit R1 of the range of resistances. As an alternative to using the demanded position x, step S1 may be omitted and the control unit 52 may perform closed-loop control solely on the basis of resistance. In this case, the target resistance Rtarget represented by data 72 is used directly as the input to the control unit 52.

The relationship between the actual range of movement Δx1 achievable by closed-loop control as shown in FIG. 3, the upper limit Ru and the lower limit R1 of the range of resistances over which closed-loop control is shown, and the value of the scaling factor λ is given by equation:

$$\lambda = (Ru - R1)/\Delta x1$$

In step S2, the control unit 52 calculates the power P of the drive current to be supplied to the SMA actuator 30 as a power control signal 71 on the basis of the target resistance Rtarget represented by data 72, together with the measured resistance Ractual of the SMA actuator 30 represented by data 73 that is derived from the detection circuit 54 and the resistance offset Roffset represented by data 74 that is derived as described below. As described above, the power P of the drive current is derived on the basis of the error between the measured resistance Ractual and the target resistance Rtarget offset by the resistance offset Roffset, that is on the basis of the value ((Rtarget−Ractual)−Roffset). For example, in the case of using proportional control, the power P of the drive current is given by the equation:

$$P = G \cdot ((Rtarget - Ractual) - Roffset)$$

where G is a gain, although as discussed above other types of control are possible, e.g. PI control or PID control.

The power control signal 71 representing the power P of the drive current to be supplied to the SMA actuator 30 is supplied to a PWM generator 73 which generates a PWM control signal 76 which is PWM-modulated in accordance with the value of the power control signal 71. The PWM control signal 76 is supplied to the drive circuit 53 which supplies the drive current to the SMA actuator 30 in accordance therewith.

In step S3, the thermal model is used to derive the at least one characteristic temperature T1, T2, ..., Tn as data 76. To do this, step S3 uses the power P of the drive current represented by the control signal 71. However as an alternative to using the control signal 71, step S3 may use a measure of the actual power of the drive current supplied to the SMA actuator 30 taken from the drive circuit 53 as shown by the dotted line in FIG. 5. Step S3 also uses the ambient temperature Tamb represented by data 77. A measure of ambient temperature may be derived as described below or alternatively a fixed level of ambient temperature may be used. Step S3 is performed by using the equations set out above to periodically update the at least one characteristic temperature T1, T2, ..., Tn. As mentioned above, when plural characteristic temperatures T1, T2, ..., Tn are used, they may be updated over different periods.

In step S4, the resistance model is used to derive the resistance offset Roffset as data 74 from the at least one characteristic temperature T1, T2, ..., Tn represented by data 76. Step S4 is performed using the equation set out above to update the resistance offset Roffset whenever any one of the at least one characteristic temperature T1, T2, ..., Tn is updated.

The parameters of the thermal model represented by the constants W1, W2, ..., Wn and τ1, τ2, ..., τn and the parameters of the resistance model represented by the constants Y1, Y2, ..., Yn may have fixed values which are typical of the design of the camera 1. They may be determined through experimentation and characterisation of the camera. This may be done generically for all cameras 1 of a given design, or in principle from measurements performed in respect of an individual camera 1 either during manufacture or even during use by the control unit 52 performing a calibration operation prior to use. The derivation of these parameters will now be described.

Each of the parameters has a physical significance. For example, the constants τ1, τ2, ..., τn are true thermal transfer time constants (for example, the time of a component to lose 63.2% of its temperature differential to ambient when the heat source is completely removed) and the constant W1 is a heat capacity (for example the energy per ° C. temperature rise of the environment, or some appropriately system scaled representation of such) and the constants W2, ..., Wn is a thermal transfer time constant (representing lag of the second component behind the first). The scaling factors Y are an approximation to ° C. per ohm (where the required resistance change itself has been calculated on the basis of a knowledge of microns movement per ohm).

Due to this physical significance, it is possible to estimate all of these parameters from simulation or experiment, for example by holding a constant power in the active range of the SMA actuator 30, and then monitoring drift in resistance. From such measured data, it is possible to extract multiple exponential responses. The time constant of these response curves is sufficient to set constants τ1, τ2, ..., τn directly. The final magnitude of response of each of these exponentials determines the constants W1, W2, ..., Wn.

There is even the possibility to measure the constants W1, W2, ..., Wn and τ1, τ2, ..., τn on-the-fly, by the control unit 52 performing a calibration operation. Having said this, onthe-fly measurement is difficult due to the numerical complexity and timescale of the drift effects. That is, a short measurement period means the results will be subject to noise, whereas a long measurement period is undesirable from a user perspective. Thus, in practice, the parameters might be set for a given design of camera 1 by numerically optimising performance across a number of actual cameras.

A simple procedure for the numerical optimisation is as follows.

1. A statistically significant number of cameras 1 are operated at several ambient temperatures with the drift compensation disabled (by setting the resistance offset Roffset to zero). The typical test waveform is just a step to a position and hold for many seconds. Power, displacement and resistance are monitored during this test. A typical response that might be recorded during this procedure is shown in FIG. 6, it being noted that the response has two distinct time constants.
2. Using knowledge of the actuator gain characteristic (in units of [position]/[power]), the residual positional error which needs to be reduced by the drift compensation. That is, positional errors which can be ascribed to resistance deviation are removed. The remainder is that which must be cancelled via drift compensation.
3. Using standard tools (e.g. a numerical optimiser or even line-fitting), the constants $W1, W2, \ldots, Wn$ and $\tau1, \tau2, \ldots, \tau n$ are estimated. It should be noted that there is an arbitrary gain scaling between the constants $W1, W2, \ldots, Wn$ and the constants $Y1, Y2, \ldots, Yn$, so the constants $Y1, Y2, \ldots, Yn$ can be fixed based on other experimental data, or on consideration of numerical precision in the implementation.
4. The compensation can be enabled and step 1 repeated to confirm the compensation quality. Steps 2 and 3 can be iterated until a good response is achieved. The primary advantage of such iteration is that it is very difficult to separate the responses of the multiple time constants from a single data set, that is from a numerical stability aspect. Iterative refinement gives the possibility of very fine adjustment of these parameters.

Thus, the control unit 52 provides closed-loop control for driving the resistance of the SMA actuator to a target value within a range from an upper limit to a lower limit. As discussed above, using resistance is advantageous as the feedback parameter because it provides accurate positional control, the position varying monotonically and close to linearly with the resistance as shown in FIG. 3. The stability of the feedback control is maintained by the inherent proportional-integral action of the SMA actuator 30 itself during heating. The overall feedback response is dominated by the response of the whole of the heating of the SMA actuator 30. Clearly, the electrical power required to drive the SMA actuator 30 through its phase transition temperature, and hold a proportional position, is highly dependent on the ambient temperature. However, use of resistance as a feedback parameter in closed-loop control combats both the temperature hysteresis of the phase change, the temperature range of the phase transition, and the high dependence on ambient temperature.

However, the position-resistance relationship experiences a degree of non-linearity and also hysteresis. Optionally, compensation for these effects may be provided in the control effected by the control unit 52, as follows.

Non-linearity occurs due to several competing phenomena. Some of the phenomena are related to the SMA material itself. Typically as the temperature of a metal such as SMA rises, its resistivity increases, leading to an increase in resistance. For the case of SMA, the material undergoes a solid-state phase change over a certain temperature range, and this can be used, along with suitable bias forces to construct an actuator. The resistivities of the two phases can also be different. Further to this, it is typical for the SMA material to be arranged such that on heating it contracts under load. The act of contracting makes the material shorter and fatter, reducing the electrical resistance. For a usefully substantial proportion of the phase chase, and material contraction, this last phenomenon dominates, and the SMA wire resistance decreases as it is heated up and contracts. Outside this region the resistance increases. Therefore, the general characteristic as the SMA is heated is for the resistance to begin to rise as it begins to contract. Then it reaches a maximum resistance before decreasing as it contracts. Towards the ends of the phase change region, on continued heating, the contraction rate slows, and the resistance reaches a minimum before rising again. The region where the SMA resistance decreases on heating (between and suitably offset from the resistance maximum and minimum) corresponds with the region in which monitoring the electrical resistance provides a good feedback parameter for controlling position. In this region, if the only phenomenon changing resistance were the geometric changes, to the material, the change in actuator position could be directly proportional to the change in resistance.

In practice the physical arrangement of the camera 1 can introduce additional non-linearity. For example, slight non-linearity is introduced when the SMA actuator is provided as an angled wire.

Non-linearity correction may be provided simply by providing a non-linear mapping function between the demanded position x and the target resistance Rtarget that compensates for the non-linearity in the resistance-position characteristic. This may be thought of as an open-loop correction of the non-linearity.

In the implementation of the control unit 52 shown in FIG. 5 this may be achieved by modifying step S1 to replace the use of the linear scaling factor $\lambda$ by a non-linear equation. One approach is to apply a linear correction to the demanded SMA resistance based on its relative difference to the measured maximum or minimum resistance. This essentially applies a second order correction to the resistance-position characteristic.

The form of the non-linear characteristic may be derived by experiment, that is by measuring the actual movement derived by the camera 1. Typically this is derived for a particular design of the camera 1 by experiments on a sample of individual cameras 1.

Achieving linearity is advantageous in many applications, for example when applying certain autofocus algorithms in the case of a camera.

Hysteresis is an intrinsic property of the SMA material caused by the phase change and manifests as the resistance-position characteristic being different when the SMA actuator 30 is heated or cooled.

Hysteresis compensation may be achieved, in a similar manner to non-linearity correction by applying a mapping function between the demanded position x and the target resistance Rtarget that is dependant on the history of previous demanded positions so as to compensate for position-resistance hysteresis. The mapping is different dependant on whether the SMA actuator 30 is being heated or cooled, for example having at least two portions representing opposite corrections to the hysteresis. This may be thought of as an open-loop correction of hysteresis. Hysteresis correction and non-linearity correction may be applied simultaneously by a single mapping function.

The form of the hysteresis characteristic may be derived by experiment, that is by measuring the actual movement derived by the camera 1. Typically this is derived for a particular design of the camera 1 by experiments on a sample of individual cameras 1.

The parameters of the hysteresis model may be predetermined, but optionally one or more parameters may be set in use by the control circuit 52 performing a calibration operation, e.g. on start-up or software reset, based on measurements of electrical properties of the SMA actuator 30, such as resistance and power required to hold a given resistance. For example the difference in resistance of the SMA actuator 30 when unheated and at a known reference point such as the local maximum resistance may be measured to provide a measure of ambient temperature, and further the average electrical power required to maintain a predetermined resistance may be measured, so that the two measurements together allowing a variable to be determined that correlates with the stress in the SMA actuator 30, which in turn correlates with the phase change temperature, which in turn correlates with one or more parameters of the hysteresis model. This variable is then used to set one or more parameters of the hysteresis model.

Figure 7:
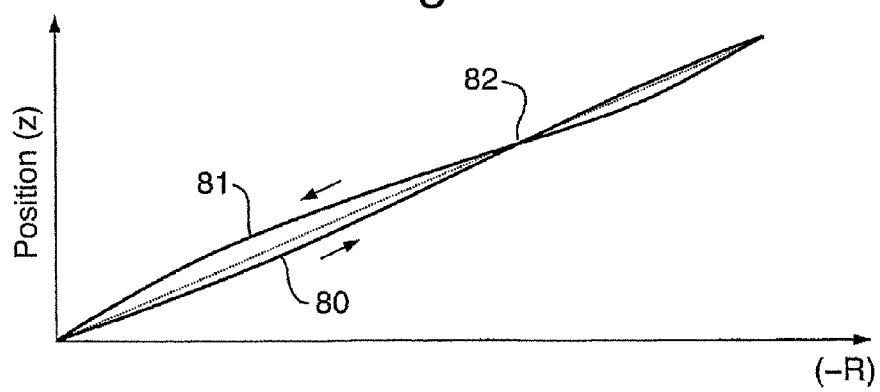
FIG. 7 is a graph of position against resistance for heating and cooling of the SMA actuator, showing the hysteresis therein.

In principle, these techniques can be used whatever the exact shape of the hysteresis characteristic that is experienced and can be determined by experiment. However, it has been found that operating the SMA actuator 30 at high stress reduces hysteresis, as well as increasing the phase transition temperature which improves hot operating performance. In addition, to reduce the maximum stresses in the SMA actuator 30, it is desirable to design the elements providing biassing against the SMA actuator 30 with minimum stiffness to minimise the change in stress of the SMA actuator 30 over the movement range. If this is done, it is found empirically that the resistance-position characteristic is the shape of a figure-of-eight in which the heating and cooling characteristics cross one another. An example of this is shown in FIG. 7 which is a graph of position against resistance (or rather the negative of resistance). Curve 81 is the characteristic during heating and curve 82 is the characteristic during cooling. The curves cross at a crossover point 83.

This characteristic thus presents a novel hysteresis compensation problem as the control algorithm must compensate for this figure-of-eight shape. A solution is to use a novel piecewise linear model of the reverse hysteresis shape in figure-of-eight shape to compensate. The physical basis for the figure eight is not entirely clear. However, it is found empirically that at lower stresses the crossover point 83 to higher commands (lower resistances), so that at low stresses the loop is essentially no longer a figure-of-eight shape, but a more normal hysteresis loop.

In addition to this novel compensation algorithm, it is found, at least in part due to the end regions of the SMA actuator 30 as with creep, that the hysteresis of the SMA actuator 30 changes over the temperature range. Therefore, as with creep compensation above, the ambient temperature estimate using the SMA wire resistance and for power can be used to adjust the hysteresis model compensation parameters to minimise hysteresis over the temperature range. It is possible to store the mapping as a predetermined pair of curves in respect of heating and cooling and to scale the stored curves by adjusting the resistance that corresponds with the crossover point 83 based on measurements of electrical properties of the SMA actuator 30.

Specifically, by making use of the empirical knowledge that the crossover point 83 varies with stress in the SMA actuator 30, and then the stress in the SMA actuator 30 also affects the transition temperatures. On this basis, the a measure of ambient temperature, for example made during a start-up calibration routine, which for example may be associated with the difference between the resistance of the SMA actuator 30 at start-up, and the resistance of the local maximum (a larger change implies a lower SMA actuator 30 temperature at start-up, which implies a lower ambient temperature). Further to this it is possible, during the calibration cycle to maintain a position (SMA wire resistance) that is at a predetermined level, eg mid-way, relative to the resistances of the local maximum and local minimum, and measure the average power required to hold this position (a different reference point may be chosen). Given the knowledge of the ambient temperature, the power required to hold position then reflects the phase transition temperature for a given module, which in turn is correlated with the stress of the SMA actuator 30 in the camera 1, which in turn is correlated with the position of the crossover point 83. Therefore the ambient temperature information, and holding power information can be used to adjust and calibrate the hysteresis model during the calibration cycle. This then allows the hysteresis performance to be optimised.

This method of correcting for hysteresis is relatively basic. No direct measurement is made of the displacement of the lens element 6 which is assumed to scale linearly (that is, devices will have an 'activity' which just linearly scales the output, which is therefore not corrected). Also, the measurements made only accommodate the zeroth order of hysteresis (that is, the bulk power offset between heating and cooling). However it is believed that in the case of a camera there is only limited gain to be had by improving these models. Calibrating displacement is difficult and generally unnecessary, as auto-focus search methods generally work based on relative movements, rather than absolute. Even if the actuator is 100% accurate in terms of step size, the focal length of the lens will be inaccurate and therefore there is still an unknown effect on focus. As always, these types of tolerance discussions are dominated by RMS considerations, and even reducing the uncertainty in one part to zero will not necessarily have a significant impact on the system performance.

There are well known, more elaborate, hysteresis models available that may be applied. An often-cited one is the discrete Preisach model of hysteresis. This type of model can be used either at the front of the calculation chain (i.e. a modifier which applies to the desired position) or at the back end of the calculation chain (i.e. a modifier which applies to the desired temperature). The Preisach model can be scaled such that the 'eye opening' at the mid point of the outer hysteresis loops match the measurements of TRMid-heat and TRMid-cool. However as mentioned earlier, these types of improvement are rarely justified in the face of the significant extra complexity of adding them.

Avoiding hysteresis is advantageous in many applications, for example when applying certain auto-focus algorithms in the case of a camera so that the same focus is reached regardless of the direction in which it is approached.

It has already been explained that the control unit 52 provides closed-loop control for driving the resistance of the SMA actuator 30 to a target value within a range from an upper limit Ru to a lower limit Rl. Setting of the upper limit Ru and the lower limit Rl will now be discussed. Closed-loop control becomes impractical close to local maximum 60 and local minimum 61 because the position-resistance gain approaches infinity. In practice therefore, the upper limit Ru and the lower limit Rl are set to the closed-loop region that are offset from the local maximum and minimum resistances. For example in an initial calibration stage, the SMA actuator 30 is heated and during the heating the local maximum 60 and local minimum 61 are detected and the resistances Rmax and Rmin thereof are detected and stored. The upper limit Ru is set a predetermined decrement below the resistance Rmax and the lower limit Rl is set a predetermined increment above the resistance Rmin. Other examples of control algorithms which may be applied are disclosed in WO-2007/113478; WO-2008/099156; and WO-2008/099155. However, as shown for example in FIG. 3, the actual range of movement Δx1 achievable is set by the values of the upper limit Ru and the lower limit Rl and is less than the total range of movement x of the SMA actuator 30 during contraction, because some of the contraction of the SMA actuator 30 near and beyond the local maximum 60 and local minimum 61 is not reached.

There is an issue with this approach as follows.

The camera 1 is configured so that when the SMA actuator 30 is unpowered, the biassing forces the lens element 6 against a hard mechanical end-stop. This end stop is arranged to correspond to a lens position at the 'far field' end of travel. For example, it may correspond to the optimal lens position for focusing at infinity. Alternatively, the infinity position may be located slightly off the end stop to allow for manufacturing tolerances, and changes in the lens optical parameters over the operating temperature range. In this latter case, it is typical for the unpowered mechanism on the end stop to correspond with a lens position where the focus approximates sufficiently close to the real infinity position that such focus is good enough when viewed on the product (such as a mobile phone) display.

At room temperature, the camera 1 is typically configured so that the resistance maximum occurs whilst the mechanism is still on the end-stop. In this way the region that is suitable for closed-loop positional control overlaps with the positions as the mechanism lifts off the end-stop. This ensures that the mechanism can be controlled right down to the end-stop.

In order to operate at relatively high temperatures, desirably the elements providing biassing create relatively high stresses in the SMA actuator 30. The higher the mechanical stress, the higher the transition temperatures, and hence the higher the possible ambient temperatures that the mechanism can successfully operate in. Therefore the stresses in the SMA actuator 30 are chosen as a compromise between operating temperature range, and fatigue failure, which is hastened for very high stresses. When the lens element 6 is pressed onto the mechanical end-stop, the stresses in the SMA actuator 30 are no longer determinate and set by the mechanism, but are unknown. It is found that above a given temperature, the phase transition has begun, and so even when the SMA actuator 30 is unpowered, it is taut, although there is not sufficient stress to lift the mechanism off the end-stop.

However, since at high ambient temperature, the actuator 30 is already taut when power is first applied, there is no recognisable local maximum resistance; the resistance will merely decrease from the value at turn on.

Generally speaking, at relatively high ambient temperature, the true local maximum 60 may occur at a temperature below ambient temperature. In this case, the SMA actuator 30 is already in the closed-loop region in its unheated state before the drive current is applied. Therefore, the initial resistance is detected as the maximum, but this is below the local maximum 60. Setting the upper limit a predetermined decrement below this detected maximum reduces the range of movement available using closed-loop control even though in this situation, closed-loop control could be performed right up to the detected maximum. In the case of a camera 1 where the infinity focus is provided at the end of the range of travel corresponding to the resistance maximum, the loss of movement discussed above may lead to the lens element 6 no longer being able to reach infinity focus.

Figure 8:
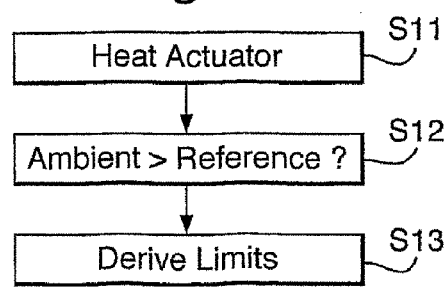
FIG. 8 is a flowchart of an operation for setting the limits of the closed-loop control.

This loss of available movement is avoided by the control unit 52 setting the upper limit Ru and the lower limit Rl by a calibration operation shown in FIG. 8 that will now be described.

In step S11, the SMA actuator 30 is heated from an unheated state whilst the resistance of the SMA actuator 30 detected by the detection circuit 54 is monitored to detect the maximum and minimum resistances.

In step S12, it is determined whether the ambient temperature is above a reference temperature. There are two alternative techniques for this.

The first technique is to determine a measure of ambient temperature and to compare that measure to a pre-stored reference temperature. In this case, step S12 may alternatively be performed before step S11. Methods of determining a measure of ambient temperature are discussed below.

The second technique is to determine whether there is a local maximum in the measure of resistance that is measured during the heating of the SMA actuator in step S11. In this case, the reference temperature is not a pre-stored value, but intrinsically in the design of the camera 1 there will be a reference temperature above which a local maximum in the resistance does not occur, as discussed above. The reference temperature may vary for different cameras 1, or over the lifetime of a camera 1.

In step S13, the upper limit Ru and the lower limit Rl are derived. The lower limit Rl is derived as before, as a predetermined increment above the minimum resistance. However, the upper limit Ru is derived as the detected maximum less a decrement that is dependant on the detected ambient temperature, rather than being fixed. In particular, the decrement has a predetermined value when the detected ambient temperature is not above the reference temperature and has a value less than the predetermined value when the detected ambient temperature is above that reference temperature.

The reference temperature is a temperature at which the SMA actuator 30 is already in the closed-loop region, as discussed above. A typical reference temperature is around 60° C. or 70° C. Thus, above this temperature, selecting a decrement having a lower decrement reduces the loss of range discussed above.

One option is for the decrement to have a second predetermined value, for example zero, when the detected ambient temperature is above that predetermined temperature. This has a disadvantage of creating a discontinuity in the response of the SMA actuator 30 with temperature when the ambient temperature passes through the reference temperature. This is not an inherent problem as the SMA actuator will have a position-demand characteristic that is of the same form, although shifted, but it is undesirable.

Another option which is available when a measure of ambient temperature is determined and which combats this disadvantage is for the decrement to have a value decreasing with temperature to a second predetermined value, for example zero, when the detected ambient temperature is in a predetermined range above the reference temperature, and having the second predetermined value when the detected ambient temperature is above the predetermined range. This effectively obtains an estimate of how far the SMA actuator 30 is, and can be used to produce a seamless reduction of the margin to ensure there are no sudden discontinuities in response.

As discussed above, the control unit 52 uses a measure of ambient temperature in several ways. The measure of ambient temperature may be derived from any source, for example a temperature sensor.

When the drive current is controlled on the basis of a measure of the resistance of the SMA actuator 30, various electrical characteristics of the SMA actuator 30 are representative of ambient temperature, and thus such an electrical characteristic of the SMA actuator may be used as a measure of ambient temperature. Thus, the measure of ambient temperature may alternatively be derived as a measure of an electrical characteristic of the SMA actuator that is representative of the ambient temperature, in the manner disclosed in detail in WO-2009/071898 which is incorporated herein by reference.

The various types of control described above may be used to drive the movement of the movable element 6 to change its position. In the case of the camera 1, this changes the focus of the lens system 7: The focus may be changed in accordance with any desired algorithm.

The focus may be changed to provide an auto-focus algorithm. One option is to use a flyback algorithm as disclosed in WO-2007/113478; WO-2008/099156; or WO-2008/099155. In this case, the lens system 7 is always moved into position by heating. Thus on cooling the position does not need to be accurately controlled. In the case of closed-loop control, this avoids the problem of hysteresis in the relationship between position and resistance.

An alternative, more standard option for providing an auto-focus algorithm is to use a conventional "hill climbing" auto-focus algorithm. In this case the algorithm homes in on the desired position from either direction. In this case, it is necessary to find and maintain a given position from both directions, and therefore it is necessary to characterise and compensate for the hysteresis associated with the SMA actuator 30. By necessity this adds complexity to the open-loop models and means that more parameters need to be set based on measurements during the start-up calibration process.

The invention claimed is:

1. A method of controlling an SMA actuation apparatus comprising an SMA actuator arranged on contraction caused by heating to drive movement of a movable element relative to a support structure on which the movable element is supported,
   the method comprising supplying a drive current through the SMA actuator to heat the SMA actuator, the power of the drive current being controlled on the basis of a closed-loop control signal for driving the resistance of the SMA actuator to a target value by performing the steps of:
   detecting a measure of the resistance of the SMA actuator;
   deriving an estimate of at least one characteristic temperature of the SMA actuation apparatus on the basis of the power of the drive current, using a thermal model that relates the at least one characteristic temperature of the SMA actuation apparatus to the power of the drive current;
   deriving a resistance offset on the basis of the estimate of at least one characteristic temperature of the SMA actuation apparatus, using a resistance model that relates a resistance offset that compensates for the variation of the resistance of the movable element with the at least one characteristic temperature of the SMA actuation apparatus to the at least one characteristic temperature of the SMA actuation apparatus; and
   generating the closed-loop control signal for controlling the power of the drive current on the basis of the error between the measure of the resistance of the SMA actuator and the target value of the resistance of the SMA actuator, adjusted by the resistance offset.

2. A method according to claim 1, wherein the resistance model is a linear equation that relates said resistance offsets to the at least one characteristic temperature of the SMA actuation apparatus to the resistance offset.

3. A method according to claim 1, wherein the step of deriving an estimate of at least one characteristic temperature of the SMA actuation apparatus on the basis of the power of the drive current consists of periodically updating the estimate of at least one characteristic temperature of the SMA actuation apparatus.

4. A method according to claim 1, wherein said at least one characteristic temperature consists of a single characteristic temperature.

5. A method according to claim 4, wherein the thermal model is a linear equation that relates the change in the single characteristic temperature to the power of the drive current and the instantaneous value of the single characteristic temperature.

6. A method according to claim 1, wherein said at least one characteristic temperature consists of plural characteristic temperatures.

7. A method according to claim 6, wherein the thermal model is a multi-stage thermal model comprising a set of linear equations in respect of the respective ones of the characteristic temperatures,
   the first linear equation relating the change in the first characteristic temperature in said succession to the instantaneous value of the first characteristic temperature and the power of the drive current, and
   the further linear equations relating the change in a respective characteristic temperature to the instantaneous value of that respective characteristic temperature and the instantaneous value of at least one other characteristic temperature.

8. A method according to claim 1, wherein the method further comprises determining the ambient temperature and the thermal model takes into account the determined ambient temperature.

9. A control system for an SMA actuation apparatus comprising an SMA actuator arranged on contraction caused by heating to drive movement of a movable element relative to a support structure on which the movable element is supported, the control system comprising:
   a current supply operative to supply a drive current through the SMA actuator to heat the SMA actuator;
   a detection circuit operative to detect a measure of the resistance of the SMA actuator; and
   a control unit operative to generate a closed-loop control signal that is supplied to current supply for controlling the power of the drive current supplied by the current supply to drive the resistance of the SMA actuator to a target value, the control unit being operative to:
   derive an estimate of at least one characteristic temperature of the SMA actuation apparatus on the basis of the power of the drive current, using a thermal model that relates the at least one characteristic temperature of the SMA actuation apparatus to the power of the drive current;
   derive a resistance offset on the basis of the estimate of at least one characteristic temperature of the SMA actuation apparatus, using a resistance model that relates a resistance offset that compensates for the variation of the resistance of movable element with the at least one characteristic temperature of the SMA actuation apparatus to the at least one characteristic temperature of the SMA actuation apparatus; and
   generate the closed-loop control signal on the basis of the error between the measure of the resistance of the SMA actuator and the target value of the resistance of the SMA actuator, adjusted by the resistance offset.

10. A control system according to claim 9, wherein the resistance model is a linear equation that relates said resistance offsets to the at least one characteristic temperature of the SMA actuation apparatus to the resistance offset.

11. A control system according to claim 9, wherein the step of deriving an estimate of at least one characteristic temperature of the SMA actuation apparatus on the basis of the power of the drive current consists of periodically updating the estimate of at least one characteristic temperature of the SMA actuation apparatus.

12. A control system according to claim 9, wherein said at least one characteristic temperature consists of a single characteristic temperature.

13. A control system according to claim 12, wherein the thermal model is a linear equation that relates the change in the single characteristic temperature to the power of the drive current and the instantaneous value of the single characteristic temperature.

14. A control system according claim 9, wherein said at least one characteristic temperature consists of plural characteristic temperatures.

15. A control system according to claim 14, wherein the thermal model is a multi-stage thermal model comprising a set of linear equations in respect of the respective ones of the characteristic temperatures,
the first linear equation relating the change in the first characteristic temperature in said succession to the instantaneous value of the first characteristic temperature and the power of the drive current, and
the further linear equations relating the change in a respective characteristic temperature to the instantaneous value of that respective characteristic temperature and the instantaneous value of at least one other characteristic temperature.

16. A control system according claim 9, wherein the control unit is further arranged to determine the ambient temperature, and the thermal model takes into account the determined ambient temperature.

17. A control system for an SMA actuation apparatus comprising an SMA actuator arranged on contraction caused by heating to drive movement of a movable element relative to a support structure on which the movable element is supported, the control system comprising:

a current supply operative to supply drive current through the SMA actuator to heat the SMA actuator, the power of the drive current being controlled on the basis of a control signal supplied to the current supply;
a detection circuit operative to detect a measure of the resistance of the SMA actuator; and
a control unit operative to generate said control signal on the basis of the measure of the resistance of the SMA actuator detected by the detection circuit and a target value for the resistance of the SMA actuator, the control circuit being arranged to select the target value in a range between an upper limit and a lower limit;
wherein, for determining the upper limit, the control unit is further arranged:
to supply a control signal that causes the SMA actuator to be heated from an unheated state and to detect the maximum value of the measure of resistance; and
to determine whether the ambient temperature is above a reference temperature;
to derive the upper limit as the detected maximum value less a decrement that is dependent on the detected ambient temperature, the decrement having a predetermined value when the detected ambient temperature is not above the reference temperature and having a value less than the predetermined value when the detected ambient temperature is above the reference temperature.

18. An apparatus according to claim 17, wherein the control unit is arranged to determine whether the ambient temperature is above a reference temperature by determining whether there is a local maximum in the measure of resistance during said heating of the SMA actuator.

19. An apparatus according to claim 17, wherein the control unit is arranged to determine whether the ambient temperature is above a reference temperature by determining a measure of ambient temperature and determining whether the measure of ambient temperature is above a pre-stored reference temperature.

20. An apparatus according to claim 19, wherein the decrement has a value decreasing with temperature to a second predetermined value when the detected ambient temperature is in a predetermined range above the reference temperature, and having the second predetermined value when the detected ambient temperature is above the predetermined range.

* * * * *